(12) United States Patent
Li et al.

(10) Patent No.: US 11,800,410 B1
(45) Date of Patent: Oct. 24, 2023

(54) SYSTEMS AND METHODS OF WIFI WITH OUT-OF-BAND SIGNALING

(71) Applicant: Meta Platforms Technologies, LLC, Menlo Park, CA (US)

(72) Inventors: Guoqing Li, Cupertino, CA (US); Dong Zheng, Saratoga, CA (US); Abhishek Kumar Agrawal, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 72 days.

(21) Appl. No.: 17/521,522

(22) Filed: Nov. 8, 2021

(51) Int. Cl.
*H04W 28/26* (2009.01)
*H04W 74/08* (2009.01)
*H04W 84/12* (2009.01)

(52) U.S. Cl.
CPC ....... *H04W 28/26* (2013.01); *H04W 74/0808* (2013.01); *H04W 84/12* (2013.01)

(58) Field of Classification Search
CPC .. H04W 28/26; H04W 74/0808; H04W 84/12
See application file for complete search history.

(56) References Cited

U.S. PATENT DOCUMENTS

| | | | |
|---|---|---|---|
| 11,277,856 B2* | 3/2022 | Lu | H04N 21/4436 |
| 2019/0288894 A1* | 9/2019 | Boudreau | H04L 27/0006 |
| 2020/0204656 A1* | 6/2020 | Lee | H04L 69/324 |
| 2021/0204140 A1* | 7/2021 | Ghosh | H04L 1/0068 |
| 2021/0409979 A1* | 12/2021 | Wang | H04W 52/0258 |
| 2022/0225245 A1* | 7/2022 | Khoshnevisan | H04W 52/08 |
| 2022/0418025 A1* | 12/2022 | Kim | H04W 52/50 |
| 2023/0036941 A1* | 2/2023 | Kim | H04B 1/005 |
| 2023/0083503 A1* | 3/2023 | Han | H04W 74/0816 370/328 |

* cited by examiner

*Primary Examiner* — Harry H Kim
(74) *Attorney, Agent, or Firm* — Foley & Lardner LLP (57) ABSTRACT

Described embodiments provide devices and methods for operating a multilink device (MLD) and a wireless node using wireless local area network (WLAN) channels and non-WLAN channels. The wireless node may transmit a first message to reserve at least a first WLAN channel. Via a non-WLAN channel, the wireless node may transmit a second message identifying the first WLAN channel to a wireless device, to cause a plurality of receivers of the wireless device to receive on the first WLAN channel. The wireless device may comprise a WLAN-based MLD. At least a defined duration after the second message, the wireless node may transmit at least one data frame to the plurality of receivers of the wireless device, via the first WLAN channel.

20 Claims, 5 Drawing Sheets

SYSTEMS AND METHODS OF WIFI WITH OUT-OF-BAND SIGNALING

FIELD OF THE DISCLOSURE

The present application generally relates to systems and methods for coordinating transmissions between a wireless node and a wireless device, including but not limited to systems and methods for performing transmissions using wireless local area network (WLAN) channels and/or non-WLAN channels.

BACKGROUND

Artificial reality such as virtual reality (VR), augmented reality (AR), or mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). Currently, HWDs (and/or other devices in an artificial reality environment) can perform continuous monitoring of a plurality of channels, to determine whether a channel has been selected to perform a transmission. Said active monitoring of the plurality of channels (e.g., by the HWDs and/or other devices) increases the power consumption.

SUMMARY

Various embodiments disclosed herein are related to systems and methods for performing and/or coordinating transmissions between a wireless node (e.g., an access point (AP), such as a router) and a wireless device (e.g., a non-AP MLD and/or a station (STA)) using WLAN channels and/or non-WLAN channels. In one example, the systems and methods described herein include a novel approach for performing/coordinating wireless communications (e.g., Wi-Fi transmission and/or receptions) between the wireless node and the wireless device. Said systems and methods can reduce and/or decrease a latency in a medium access process (or other processes) by performing medium contention on a plurality of WLAN channels without requiring the wireless device (e.g., STA) to actively use a plurality of receivers (e.g., wireless radios, such as Wi-Fi radios for listening) to monitor all the WLAN channels. For example, the wireless node can use low-power out-of-band (OOB) signaling (e.g., a second message/transmission via a non-WLAN channel) to communicate and/or identify a selected channel (e.g., a first WLAN channel, on which the wireless node has won contention) to the wireless device, instead of using any of the plurality of WLAN channels to indicate the selected channel. As such, the power consumption associated with monitoring (e.g., by the wireless device) the plurality of WLAN channels can be reduced, for example, by using a single OOB (e.g., Bluetooth low energy (BLE) and/or ultra-wideband (UWB)) receiver (e.g., receive chain) of the wireless device to monitor the OOB signaling (e.g., instead of using a plurality of WLAN receivers of the wireless device).

Various embodiments disclosed herein are related to a method for operating a multilink device (MLD) and a wireless node using wireless local area network (WLAN) channels and non-WLAN channels. A wireless node may transmit a first message to reserve at least a first WLAN channel. Via a non-WLAN channel, the wireless node may transmit a second message identifying the first WLAN channel to a wireless device, to cause a plurality of receivers of the wireless device to receive on the first WLAN channel. The wireless device may comprise a WLAN-based MLD. At least a defined duration after the second message, the wireless node may transmit at least one data frame to the plurality of receivers of the wireless device, via the first WLAN channel.

In some embodiments, the wireless node may perform medium contention on a plurality of WLAN channels, to identify the first WLAN channel from the plurality of WLAN channels. The wireless node may perform the medium contention while the plurality of receivers of the wireless device are in a first low-power state. In certain embodiments, the wireless node may perform the medium contention at or before a scheduled time at which the wireless device transitions the plurality of receivers from a second low-power state to the first low-power state. In some embodiments, the first message may comprise a clear-to-send (CTS) frame, a null frame, or an empty data frame.

In certain embodiments, the first message can be configured to indicate to the wireless device to skip or bypass or refrain from sending an acknowledgement message. In some embodiments, the wireless node may receive a third message from the wireless device. The third message may indicate a time period for the plurality of receivers of the wireless device to transition from a first low-power state to an active state capable of receiving on at least the first WLAN channel. In some embodiments, a sum of a transmission duration of the second message and the indicated time period is less than a sum of a transmission duration of the first message and the defined duration. In certain embodiments, the wireless node may transfer a transmission opportunity to the wireless device, after completion of the transmitting of the at least one data frame.

In one aspect, the present disclosure is directed to a wireless node that operates with a multilink device (MLD) using wireless local area network (WLAN) channels and non-WLAN channels. The wireless node may include at least one processor. The at least one processor can be configured to transmit, via a transceiver, a first message to reserve at least a first wireless local area network (WLAN) channel. The at least one processor can be configured to transmit, via the transceiver on a non-WLAN channel, a second message identifying the first WLAN channel to a wireless device, to cause a plurality of receivers of the wireless device to receive on the first WLAN channel. The wireless device may comprise a WLAN-based multilink device (MLD). The at least one processor can be configured to transmit, via the transceiver at least a defined duration after the second message, at least one data frame to the plurality of receivers of the wireless device, via the first WLAN channel.

In some embodiments, the at least one processor may be configured to perform, via the transceiver, medium contention on a plurality of WLAN channels, to identify the first WLAN channel from the plurality of WLAN channels. In certain embodiments, the at least one processor can be configured to perform, via the transceiver, the medium contention while the plurality of receivers of the wireless device are in a first low-power state. The at least one processor can be configured to perform, via the transceiver, the medium contention at or before a scheduled time at which the wireless device transitions the plurality of receivers from a second low-power state to the first low-power state. In some embodiments, the first message may comprise a clear-to-send (CTS) frame, a null frame, or an empty data frame.

In certain embodiments, the first message can be configured to indicate to the wireless device to skip or bypass sending an acknowledgement message. In some embodiments, the at least one processor may be configured to receive, via the transceiver from the wireless device, a third message indicating a time period for the plurality of receivers of the wireless device to transition from a first low-power state to an active state capable of receiving on at least the first WLAN channel. In some embodiments, a sum of a transmission duration of the second message and the indicated time period is less than a sum of a transmission duration of the first message and the defined duration. In certain embodiments, the at least one processor can be configured to transfer a transmission opportunity to the wireless device, after completing transmission of the at least one data frame.

In one aspect, the present disclosure is directed to a non-transitory computer readable medium storing program instructions. The program instructions may cause at least one processor to transmit, via a transceiver, a first message to reserve at least a first wireless local area network (WLAN) channel. The program instructions may cause the at least one processor to transmit, via the transceiver on a non-WLAN channel, a second message identifying the first WLAN channel to a wireless device, to cause a plurality of receivers of the wireless device to receive on the first WLAN channel. The wireless device may comprise a WLAN-based multilink device (MLD). The program instructions may cause the at least one processor to transmit, via the transceiver at least a defined duration after the second message, at least one data frame to the plurality of receivers of the wireless device, via the first WLAN channel. In certain embodiments, the program instructions may cause the at least one processor to perform, via the transceiver, medium contention at or before a scheduled time at which the wireless device transitions the plurality of receivers from a second low-power state to a first low-power state.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The systems and methods presented herein include a novel approach for performing and/or coordinating transmissions between a wireless node (e.g., an AP, such as a router and/or other network devices) and a wireless device (e.g., a non-AP MLD and/or a STA) using WLAN channels and/or non-WLAN channels. In one example, the present disclosure is directed to a novel energy-efficient approach for wireless communications (e.g., WLAN communications, such as Wi-Fi communications). Certain approaches (e.g., multilink approaches) use a plurality of WLAN channels to reduce a latency value of an access method (such as a Wi-Fi medium access method). In said approaches, the plurality of WLAN channels can be connected to a single medium access control (MAC) address. In certain embodiments, multilink approaches (e.g. approaches for systems, methods, and/or devices using a plurality of WLAN channels) can provide and/or include mechanisms for performing medium contention and/or channel selection across the plurality of WLAN channels (e.g., across a plurality of RF frequencies) at a same time instance.

In some embodiments, a performance of a network (e.g., a Wi-Fi network, such as peer-to-peer, and/or peer-to-multi peer networks) can be improved by using wireless nodes and/or wireless devices with low-complexity and/or low-power multilink radio designs (e.g., a STA design and/or client design). A low-complexity and/or low-power multilink design can reduce the cost, size, and/or power consumption of the wireless node and/or the wireless device, for instance. In certain embodiments, a low-complexity and/or low-power multilink design can reduce a number and/or amount of activated radio frequency (RF) chains (e.g., activated receivers for listening, monitoring and/or observing a plurality of WLAN channels) in the wireless device, for example, thereby causing a reduction in the power consumption of the wireless device.

Figure 1:
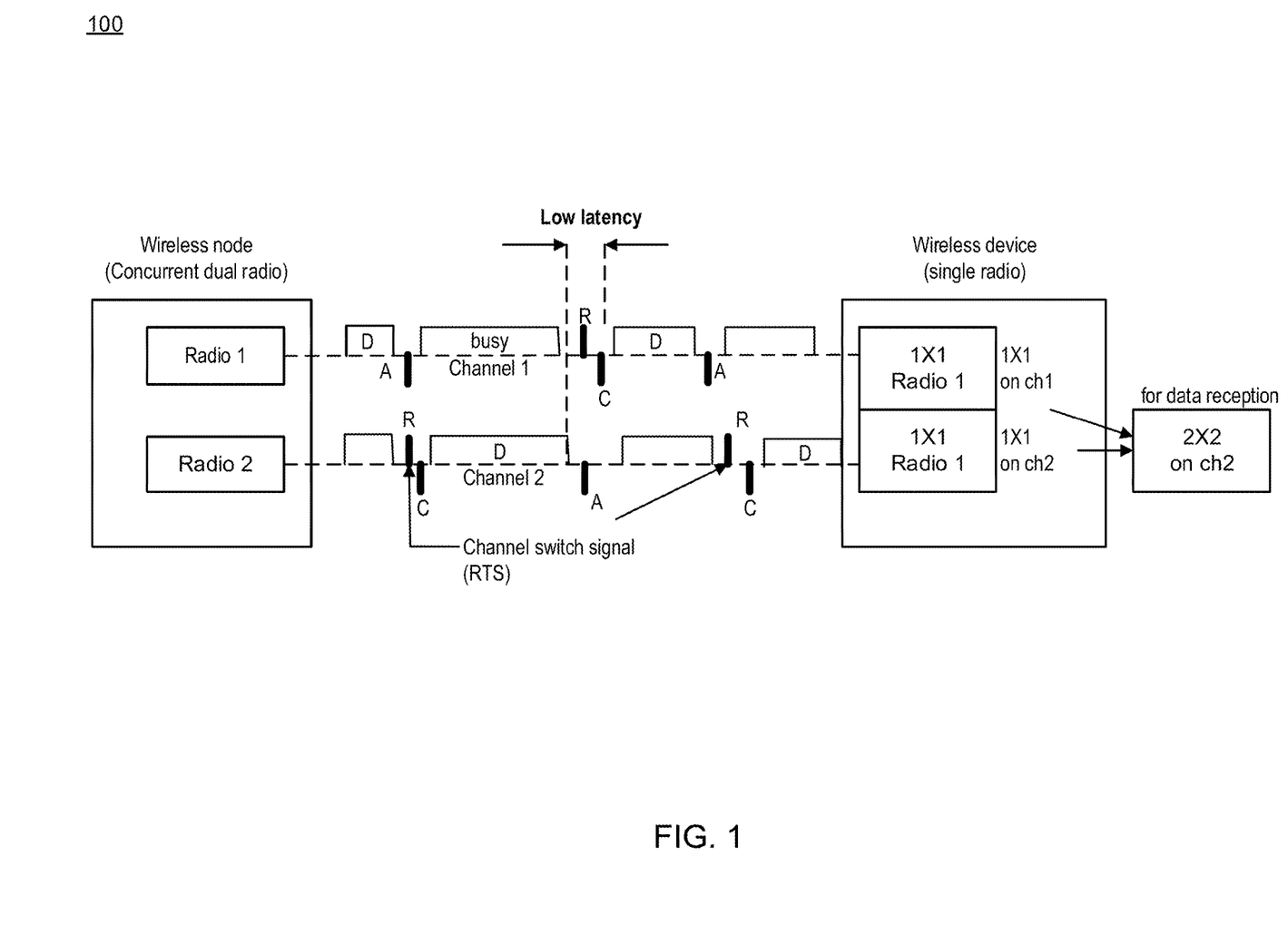
FIG. 1 is a diagram of example communications between a wireless node and wireless device, according to example implementations of the present disclosure.

In some approaches, one or more wireless devices (e.g., STAs) can activate and/or use a plurality of WLAN channels to monitor incoming transmissions (e.g., transmissions from a wireless node). For instance, as depicted in FIG. 1, a wireless device (e.g. STA) can activate/enable and/or use a plurality of WLAN channels (e.g., channel 1, channel 2, and/other channels) to monitor for a transmission/notification from the wireless node (e.g., AP). In one example, the wireless device may receive and/or obtain a frame (e.g., an initial control frame of a frame exchange, and/or other frames) from the wireless node (e.g., an AP of a MLD) via a WLAN channel of the plurality of WLAN channels. The wireless node can transmit, communicate and/or provide the frame via an initial control frame in a non-high throughput (non-HT) duplicate (or other types of packet formats), and/or an orthogonal frequency-division multiplexing (OFDM) physical layer protocol data unit (PPDU) (e.g., with a rate of 6, 12, and/or 24 Mbps). In one example, the frame may include or correspond to a multi user request to send (MU-RTS) and/or buffer status report poll (BSRP) trigger frame (TF). Responsive to receiving said frame (e.g., via the WLAN channel, indicating that further transmissions are to be performed in that specific WLAN channel), the wireless device may tune the plurality of receivers to the WLAN channel, and can direct and perform transmit (Tx) and/or receive (Rx) operations via the WLAN channel. For instance, in FIG. 1, responsive to receiving the frame via channel 2 (or other channels), the wireless device can receive/obtain a data frame (e.g., 2×2 on channel 2) from the wireless node. In certain embodiments, the wireless device can perform the Tx and/or Rx operations at least a defined duration (e.g. a short interframe space (SIFS) duration) after receiving the frame. Furthermore, the wireless device may be unable to perform Tx and/or Rx operations via other WLAN channels of the plurality of WLAN channels. For instance, upon receiving the data frame vie channel 2, the wireless device may be unable to perform any operations via channel 1. After a switching delay (e.g., channel switch signal in FIG. 1), one or more wireless devices (in proximity to the wireless node) can continue to monitor the plurality of WLAN channels (e.g., return to a listen mode) upon completion of the Tx/Rx operation(s).

In certain embodiments, and as described above, the wireless node may send, broadcast and/or communicate the frame (e.g., a W-Fi RTS/CTS) via a WLAN channel, to indicate and/or specify a selected channel (e.g., the WLAN channel being used to perform the transmission of the frame and/or subsequent frame(s)) to the wireless device. In one example, the wireless node may send the frame (e.g., via the WLAN channel) prior to performing a Tx and/or Rx operation via the WLAN channel (e.g., before sending a data packet or frame via the selected channel). As such, the wireless device can monitor and/or analyze (e.g., during a listening operating mode) the plurality of WLAN channels (e.g., channels 1 and 2 of FIG. 1) to detect the transmission of the frame (e.g., transmitted by the wireless node) via the particular WLAN channel (e.g., channel 2). Monitoring a plurality of WLAN channels can enable a usage of a plurality of receivers (e.g., Wi-Fi Rx chains, or Rx chains) of the wireless device, thereby increasing the amount of power consumed by the wireless device. Furthermore, at least one RF phase-locked loop (PLL) can be used for each enabled/active receiver of the wireless device, resulting in an increased cost of the wireless device (e.g., to support multiple PLLs). Moreover, wireless devices with a single receiver (e.g., one Rx chain) are unable to (e.g., simultaneously) monitor a plurality of WLAN channels (e.g., monitor to detect a frame from the wireless node).

The systems and methods presented herein include a novel approach for performing wireless communications (e.g. Wi-Fi transmission and/or receptions) between the wireless node and the wireless device. Said systems and methods can reduce and/or decrease a latency in a medium access process (or other processes) by performing medium contention on a plurality of WLAN channels without requiring the wireless device (e.g., STA) to actively use a plurality of receivers (e.g., wireless radios, such as listen Wi-Fi radios) to monitor all the WLAN channels. For example, the wireless node can use low-power OOB signaling or messaging (e.g., a second message/transmission via a non-WLAN channel) to communicate and/or identify a selected channel (e.g., a first WLAN channel) to the wireless device, instead of using any of the plurality of WLAN channels to indicate the selected channel. As such, the power consumption associated with monitoring (e.g., by the wireless device) the plurality of WLAN channels can be reduced, for example, by using a single OOB (e.g., Bluetooth low energy (BLE) and/or ultra-wideband (UWB)) receiver (e.g., receive chain) of the wireless device to monitor the OOB signaling on a single (predefined/preconfigured) OOB channel (e.g., instead of using a plurality of WLAN receive (Rx) chains of the wireless device). Furthermore, the wireless device is no longer required to support Rx or listening operations across a plurality of WLAN channels at a same time. For instance, a single low power non-WLAN Rx chain (and/or a single PLL) can be used/activated (instead of a plurality of WLAN chains), given that support for Rx operations across a plurality of wireless channels (e.g., at the same time) is no longer required.

Figure 2:
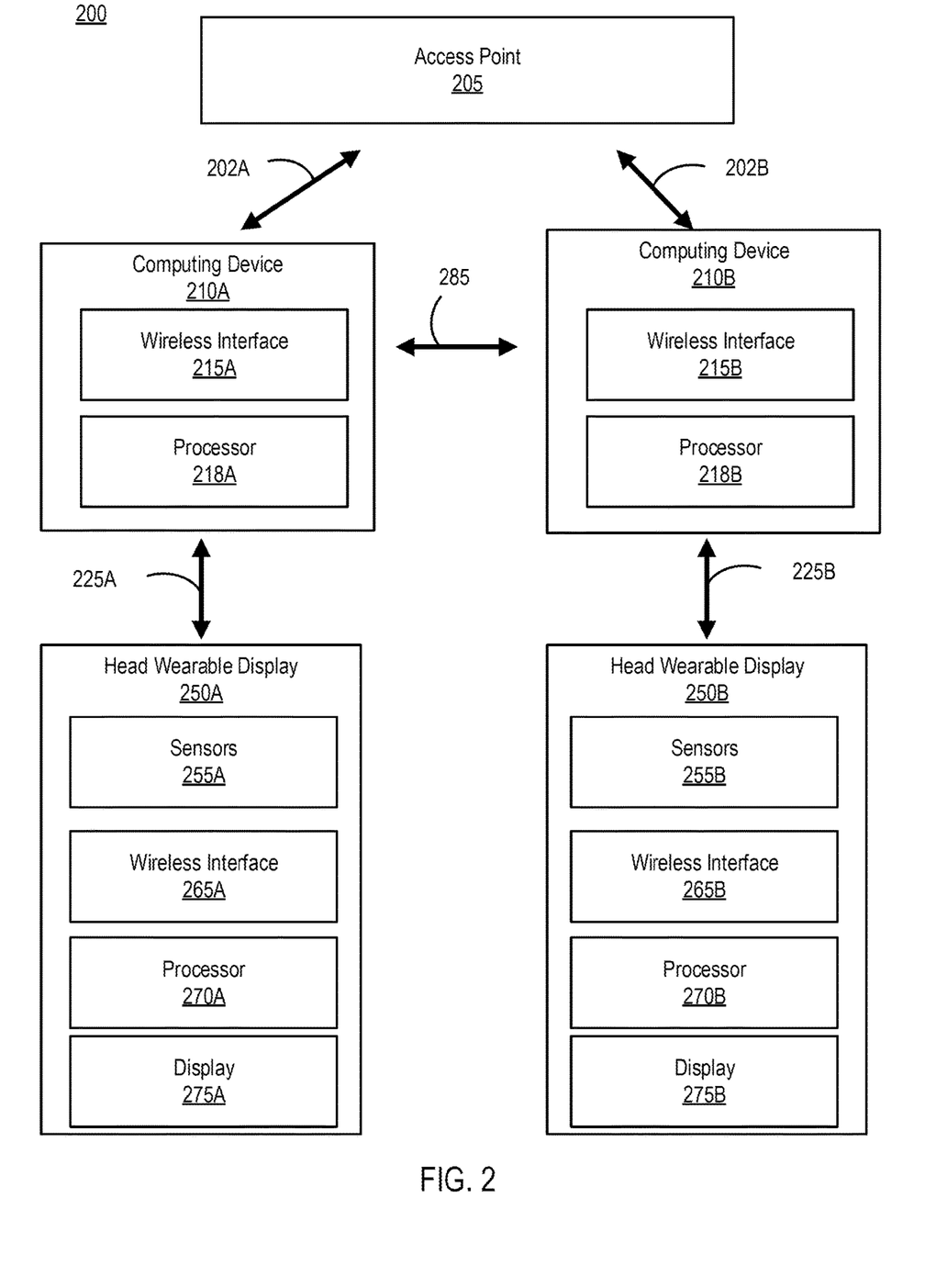
FIG. 2 is a diagram of a system environment including an artificial reality system, according to an example implementation of the present disclosure.

In view of the above discussion regarding coordinating and/or performing wireless communications (e.g., Rx and/or Tx operations) between a wireless node and a wireless device (e.g., using WLAN channel(s) and/or non-WLAN channel(s)), a process and/or system for performing/coordinating/facilitating said communications may be beneficial, as further explained in the following passages. FIG. 2 is a block diagram of an example artificial reality system environment 200, in which a wireless node and/or a wireless device can coordinate transmissions via WLAN and/or non-WLAN channels. In some embodiments, the artificial reality system environment 200 includes an access point (AP) 205, one or more HWDs 250 (e.g., HWD 250A, 250B), and one or more computing devices 210 (computing devices 210A, 210B; sometimes referred to as stage devices or consoles) providing data for artificial reality to the one or more HWDs 250. In some embodiments, the wireless device may include or correspond to the computing device(s) 210A, 210B and/or other devices of the environment 200 (e.g., HWD(s) 250A, 250B). In some embodiments, the wireless node may include or correspond to the AP 205 and/or other devices of the environment 200 (e.g., computing device(s) 210A, 210B or console).

In some embodiments, the HWD(s) 250 can communicate with a network via the computing device(s) 210 and/or at least one AP 205. In certain embodiments, the wireless node (e.g., AP 205) may transmit, send, broadcast and/or communicate a message (e.g., a clear-to-send (CTS) frame, a null frame, and/or an empty data frame) to reserve at least a first WLAN channel (e.g., interlink(s) 202 and/or other channels/links). The wireless node may transmit a second message (e.g., an OOB signal) to a wireless device (e.g., computing device(s) 210) via a non-WLAN channel (e.g. other interlink(s) 202 and/or other channels/links), wherein the second message can identify and/or specify the first WLAN channel. In certain embodiments, the second message may cause a plurality of receivers (e.g., Rx chains of wireless interface(s) 215) of the wireless device to receive (e.g., receive data packets and/or other information) on the first WLAN channel. At least a defined duration (e.g., SIFS duration and/or other durations) after the second message, the wireless node may send and/or communicate at least one data frame to the receivers of the wireless device via the first WLAN channel.

In certain embodiments, the access point 205 may be a router or any network device allowing one or more computing devices 210 and/or one or more HWDs 250 to access a network (e.g., the Internet). The access point 205 may be replaced by any communication device (cell site). A computing device 210 may be a custom device or a mobile device that can retrieve content from the access point 205, and provide image data of artificial reality to a corresponding HWD 250. Each HWD 250 may present the image of the artificial reality to a user according to the image data. In some embodiments, the artificial reality system environment 200 includes more, fewer, or different components than shown in FIG. 2. In some embodiments, the computing devices 210A, 210B communicate with the access point 205 through wireless links 202A, 202B (e.g., interlinks), respectively. In some embodiments, the computing device 210A communicates with the HWD 250A through a wireless link 225A (e.g., intralink), and the computing device 210B communicates with the HWD 250B through a wireless link 225B (e.g., intralink). In some embodiments, functionality of one or more components of the artificial reality system environment 200 can be distributed among the components in a different manner than is described here. For example, some of the functionality of the computing device 210 may be performed by the HWD 250. For example, some of the functionality of the HWD 250 may be performed by the computing device 210.

In some embodiments, the HWD 250 is an electronic component that can be worn by a user and can present or provide an artificial reality experience to the user. The HWD 250 may be referred to as, include, or be part of a head mounted display (HMD), head mounted device (HMD), head wearable device (HWD), head worn display (HWD) or head worn device (HWD). The HWD 250 may render one or more images, video, audio, or some combination thereof to provide the artificial reality experience to the user. In some embodiments, audio is presented via an external device (e.g., speakers and/or headphones) that receives audio information from the HWD 250, the computing device 210, or both, and presents audio based on the audio information. In some embodiments, the HWD 250 includes sensors 255, a wireless interface 265, a processor 270, and a display 275. These components may operate together to detect a location of the HWD 250 and a gaze direction of the user wearing the HWD 250, and render an image of a view within the artificial reality corresponding to the detected location and/or orientation of the HWD 250. In other embodiments, the HWD 250 includes more, fewer, or different components than shown in FIG. 2.

In some embodiments, the sensors 255 include electronic components or a combination of electronic components and software components that detects a location and an orientation of the HWD 250. Examples of the sensors 255 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 255 detect the translational movement and the rotational movement, and determine an orientation and location of the HWD 250. In one aspect, the sensors 255 can detect the translational movement and the rotational movement with respect to a previous orientation and location of the HWD 250, and determine a new orientation and/or location of the HWD 250 by accumulating or integrating the detected translational movement and/or the rotational movement. Assuming for an example that the HWD 250 is oriented in a direction 25 degrees from a reference direction, in response to detecting that the HWD 250 has rotated 20 degrees, the sensors 255 may determine that the HWD 250 now faces or is oriented in a direction 45 degrees from the reference direction. Assuming for another example that the HWD 250 was located two feet away from a reference point in a first direction, in response to detecting that the HWD 250 has moved three feet in a second direction, the sensors 255 may determine that the HWD 250 is now located at a vector multiplication of the two feet in the first direction and the three feet in the second direction.

In some embodiments, the wireless interface 265 includes an electronic component or a combination of an electronic component and a software component that communicates with the computing device 210. In some embodiments, the wireless interface 265 includes or is embodied as a transceiver for transmitting and receiving data through a wireless medium. The wireless interface 265 may communicate with a wireless interface 215 of a corresponding computing device 210 through a wireless link 225 (e.g., intralink). The wireless interface 265 may also communicate with the access point 205 through a wireless link (e.g., interlink). Examples of the wireless link 225 include a near field communication link, Wi-Fi direct, Bluetooth, or any wireless communication link. Through the wireless link 225, the wireless interface 265 may transmit to the computing device 210 data indicating the determined location and/or orientation of the HWD 250, the determined gaze direction of the user, and/or hand tracking measurement. Moreover, through the wireless link 225, the wireless interface 265 may receive from the computing device 210 image data indicating or corresponding to an image to be rendered.

In some embodiments, the processor 270 includes an electronic component or a combination of an electronic component and a software component that generates one or more images for display, for example, according to a change in view of the space of the artificial reality. In some embodiments, the processor 270 is implemented as one or more graphical processing units (GPUs), one or more central processing unit (CPUs), or a combination of them that can execute instructions to perform various functions described herein. The processor 270 may receive, through the wireless interface 265, image data describing an image of artificial reality to be rendered, and render the image through the display 275. In some embodiments, the image data from the computing device 210 may be encoded, and the processor 270 may decode the image data to render the image. In some embodiments, the processor 270 receives, from the computing device 210 through the wireless interface 265, object information indicating virtual objects in the artificial reality space and depth information indicating depth (or distances from the HWD 250) of the virtual objects. In one aspect, according to the image of the artificial reality, object information, depth information from the computing device 210, and/or updated sensor measurements from the sensors 255, the processor 270 may perform shading, reprojection, and/or blending to update the image of the artificial reality to correspond to the updated location and/or orientation of the HWD 250.

In some embodiments, the display 275 is an electronic component that displays an image. The display 275 may, for example, be a liquid crystal display or an organic light emitting diode display. The display 275 may be a transparent display that allows the user to see through. In some embodiments, when the HWD 250 is worn by a user, the display 275 is located proximate (e.g., less than 3 inches) to the user's eyes. In one aspect, the display 275 emits or projects light towards the user's eyes according to image generated by the processor 270. The HWD 250 may include a lens that allows the user to see the display 275 in a close proximity.

In some embodiments, the processor 270 performs compensation to compensate for any distortions or aberrations. In one aspect, the lens introduces optical aberrations such as a chromatic aberration, a pin-cushion distortion, barrel distortion, etc. The processor 270 may determine a compensation (e.g., predistortion) to apply to the image to be rendered to compensate for the distortions caused by the lens, and apply the determined compensation to the image from the processor 270. The processor 270 may provide the predistorted image to the display 275.

In some embodiments, the computing device 210 is an electronic component or a combination of an electronic component and a software component that provides content to be rendered to the HWD 250. The computing device 210 may be embodied as a mobile device (e.g., smart phone, tablet PC, laptop, etc.). The computing device 210 may operate as a soft access point. In one aspect, the computing device 210 includes a wireless interface 215 and a processor 218. These components may operate together to determine a view (e.g., a FOV of the user) of the artificial reality corresponding to the location of the HWD 250 and the gaze direction of the user of the HWD 250, and can generate image data indicating an image of the artificial reality corresponding to the determined view. The computing device 210 may also communicate with the access point 205, and may obtain AR/VR content from the access point 205, for example, through the wireless link 202 (e.g., interlink). The computing device 210 may receive sensor measurement indicating location and the gaze direction of the user of the HWD 250 and provide the image data to the HWD 250 for presentation of the artificial reality, for example, through the wireless link 225 (e.g., intralink). In other embodiments, the computing device 210 includes more, fewer, or different components than shown in FIG. 2.

In some embodiments, the wireless interface 215 is an electronic component or a combination of an electronic component and a software component that communicates with the HWD 250, the access point 205, other computing device 210, or any combination of them. In some embodiments, the wireless interface 215 includes or is embodied as a transceiver for transmitting and receiving data through a wireless medium. The wireless interface 215 may be a counterpart component to the wireless interface 265 to communicate with the HWD 250 through a wireless link 225 (e.g., intralink). The wireless interface 215 may also include a component to communicate with the access point 205 through a wireless link 202 (e.g., interlink). Examples of wireless link 202 include a cellular communication link, a near field communication link, Wi-Fi, Bluetooth, 60 GHz wireless link, or any wireless communication link. The wireless interface 215 may also include a component to communicate with a different computing device 210 through a wireless link 285. Examples of the wireless link 285 include a near field communication link, Wi-Fi direct, Bluetooth, or any wireless communication link. Through the wireless link 202 (e.g., interlink), the wireless interface 215 may obtain AR/VR content, or other content from the access point 205. Through the wireless link 225 (e.g., intralink), the wireless interface 215 may receive from the HWD 250 data indicating the determined location and/or orientation of the HWD 250, the determined gaze direction of the user, and/or the hand tracking measurement. Moreover, through the wireless link 225 (e.g., intralink), the wireless interface 215 may transmit to the HWD 250 image data describing an image to be rendered. Through the wireless link 285, the wireless interface 215 may receive or transmit information indicating the wireless link 225 (e.g., channel, timing) between the computing device 210 and the HWD 250. According to the information indicating the wireless link 225, computing devices 210 may coordinate or schedule operations to avoid interference or collisions.

The processor 218 can include or correspond to a component that generates content to be rendered according to the location and/or orientation of the HWD 250. In some embodiments, the processor 218 includes or is embodied as one or more central processing units, graphics processing units, image processors, or any processors for generating images of the artificial reality. In some embodiments, the processor 218 may incorporate the gaze direction of the user of the HWD 250 and a user interaction in the artificial reality to generate the content to be rendered. In one aspect, the processor 218 determines a view of the artificial reality according to the location and/or orientation of the HWD 250. For example, the processor 218 maps the location of the HWD 250 in a physical space to a location within an artificial reality space, and determines a view of the artificial reality space along a direction corresponding to the mapped orientation from the mapped location in the artificial reality space. The processor 218 may generate image data describing an image of the determined view of the artificial reality space, and transmit the image data to the HWD 250 through the wireless interface 215. The processor 218 may encode the image data describing the image, and can transmit the encoded data to the HWD 250. In some embodiments, the processor 218 generates and provides the image data to the HWD 250 periodically (e.g., every 11 ms or 16 ms).

In some embodiments, the processors 218, 270 may configure or cause the wireless interfaces 215, 265 to toggle, transition, cycle or switch between a sleep mode and a wake up mode. In the wake up mode, the processor 218 may enable the wireless interface 215 and the processor 270 may enable the wireless interface 265, such that the wireless interfaces 215, 265 may exchange data. In the sleep mode, the processor 218 may disable (e.g., implement low power operation in) the wireless interface 215 and the processor 270 may disable the wireless interface 265, such that the wireless interfaces 215, 265 may not consume power or may reduce power consumption. The processors 218, 270 may schedule the wireless interfaces 215, 265 to switch between the sleep mode and the wake up mode periodically every frame time (e.g., 11 ms or 16 ms). For example, the wireless interfaces 215, 265 may operate in the wake up mode for 2 ms of the frame time, and the wireless interfaces 215, 265 may operate in the sleep mode for the remainder (e.g., 9 ms) of the frame time. By disabling the wireless interfaces 215, 265 in the sleep mode, power consumption of the computing device 210 and the HWD 250 can be reduced.

Figure 3:
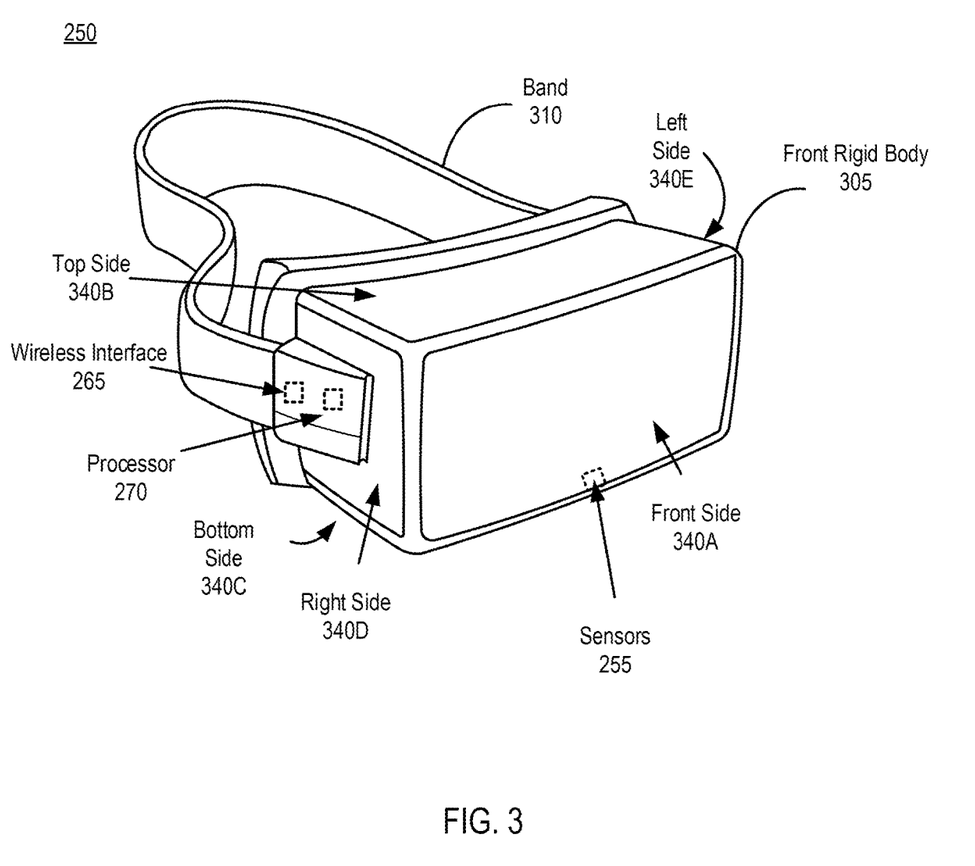
FIG. 3 is a diagram of a head wearable display, according to an example implementation of the present disclosure.

FIG. 3 is a diagram of a HWD 250, in accordance with an example embodiment. In some embodiments, the HWD 250 includes a front rigid body 305 and a band 310. The front rigid body 305 includes the display 275 (not shown in FIG. 3), the lens (not shown in FIG. 3), the sensors 255, the wireless interface 265, and the processor 270. In the embodiment shown by FIG. 3, the wireless interface 265, the processor 270, and the sensors 255 are located within the front rigid body 305, and may not visible to the user. In other embodiments, the HWD 250 has a different configuration than shown in FIG. 3. For example, the wireless interface 265, the processor 270, and/or the sensors 255 may be in different locations than shown in FIG. 3.

Figure 4:
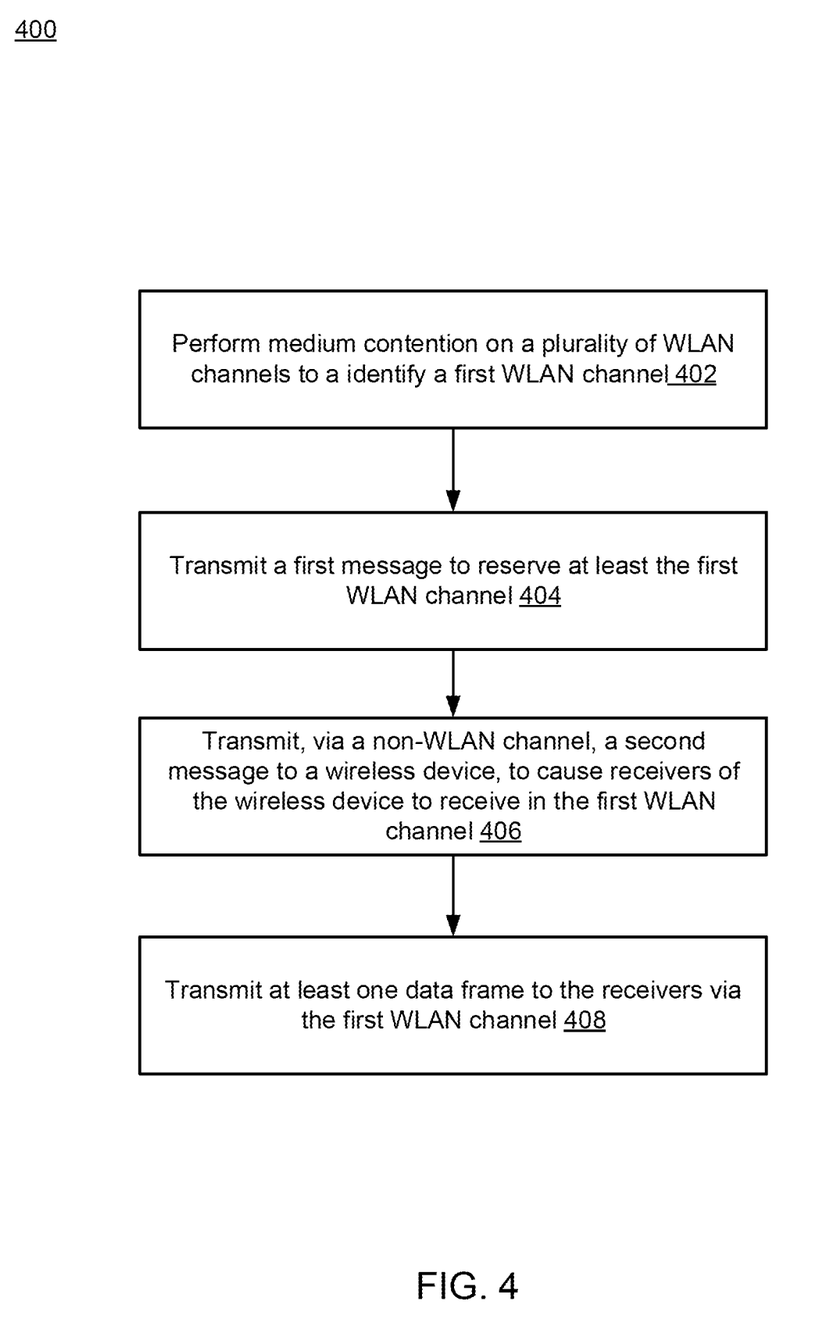
FIG. 4 is a flowchart of an example method for coordinating communications between a wireless node and a wireless device using WLAN channels and/or non-WLAN channels, according to an example implementation of the present disclosure.

FIG. 4 is a flow diagram of one embodiment of a process 400 for performing and/or coordinating transmissions between a wireless node and a wireless device using WLAN channels and/or non-WLAN channels, according to an example implementation of the present disclosure. The functionalities of the process 400 may be implemented using, or performed by, the components detailed herein in connection with FIGS. 1-3 and 5. In some embodiments, the process 400 can be performed by a HWD 250. In some embodiments, the process 400 can be performed by other entities, such as a computing device 210 and/or an AP 205. In some embodiments, the process 400 may include more, fewer, or different steps than shown in FIG. 4.

In brief overview, the process 400 can include performing medium contention on a plurality of WLAN channels to identify a first WLAN channel (402). The process 400 may include transmitting a first message to reserve at least the first WLAN channel (404). The process 400 may include transmitting, via a non-WLAN channel, a second message to a wireless device, to cause receivers of the wireless device to receive in the first WLAN channel (406). The process 400 may include transmitting at least one data frame to the receivers via the first WLAN channel (408).

Referring now to operation (402), and in some embodiments, a wireless node (e.g., AP 205) may perform medium contention by performing a backoff procedure with random duration on a plurality of WLAN channels (e.g., a plurality of Wi-Fi channels and/or other wireless channels), e.g., to identify/determine a WLAN channel for data transmission with the wireless device. In certain embodiments, the wireless node may perform medium contention and/or channel selection (e.g., according to channel quality) to identify and/or select a first WLAN channel from the plurality of WLAN channels. By performing medium contention across the plurality of WLAN channels, the wireless node can reduce and/or decrease the latency of data transmission and/or increase channel diversity. In some embodiments, the wireless node may perform the medium contention while the plurality of receivers (e.g., plurality of non-WLAN Rx chains) of the wireless device are in a first low-power state (e.g., a shallow sleep state). The wireless device may enter the first low-power state at/during a scheduled wake-up time, according to a target wake time (TWT) schedule for instance, to reduce power consumption. In some embodiments, the wireless node may perform the medium contention at or before or during a scheduled time (e.g., the wake-up time). The scheduled time may include or correspond to a time at which the wireless device transitions the plurality of receivers from a second low-power state (e.g., a deep sleep state) to the first low-power state. In one example, the wireless device (e.g., STA) can remain in a sleep state/mode during the scheduled time (e.g., scheduled wake-up time). The non-WLAN channel (e.g., an OOB radio, such as UWB radio, BLE radio and/or other types of radio signals) of the wireless device can be enabled (e.g., during the scheduled time) to receive notifications, messages and/or signaling (e.g., a second message) from the wireless node (e.g., AP). In certain embodiments, the wireless device can switch, change, transition and/or modify the plurality of receivers from the second low-power state to the first low-power state (e.g., to allow for a faster wake-up and/or channel selection after performing medium contention). In certain embodiments, the amount of power consumed by the wireless device by enabling the non-WLAN channel and/or transitioning the receivers to a first low-power state can be less than the amount of power consumed by the wireless device by performing (e.g., during the wake-up time/duration, and/or beyond) continuous monitoring of a plurality of WLAN channels (e.g., monitoring for a message that indicates a WLAN channel).

Referring now to operation (404), and in some embodiments, the wireless node may transmit, send, broadcast and/or communicate a first message. The first message may reserve, hold and/or secure at least a first WLAN channel. In certain embodiments, the first message may comprise a clear-to-send (CTS) frame, a null frame (e.g., quality of service (QoS) null frame), and/or an empty data frame (e.g., dummy QoS data frame). In one example, the wireless node can send a CTS frame, null frame and/or empty data frame to reserve at least the first WLAN channel. The message(s)/frame(s) can occupy or otherwise use/reserve/clear the first WLAN channel while the wireless device prepares to receive data on the first WLAN channel (e.g., while the wireless device wakes up on the first WLAN channel to start receiving data frames). The choice of which type of frame(s) (e.g., a CTS frame, a null frame and/or an empty data frame) to send and/or use can be configured and/or determined according to a (known, predetermined or expected) time period for the plurality of receivers of the wireless device to transition from a first low-power state (e.g., shallow sleep) to an active state (e.g. a time period corresponding to a wake up delay). For example, a null frame and/or an empty data frame can be used and/or selected (e.g. for reserving the first WLAN channel) to reserve, specify and/or accommodate a longer time period (e.g. a longer wake-up delay of the receivers). In some embodiments, the first message can be configured to indicate and/or specify to the wireless device to skip or bypass or refrain from sending an acknowledgement (ACK) message (and/or other messages). In one example, if the first message comprises a null frame and/or an empty data frame, an ACK policy can be configured to a "NO ACK" policy (e.g., for skipping or omitting an ACK message).

In some embodiments, the wireless node may receive and/or obtain a third message (e.g., capability message) from the wireless device. The third message can specify and/or indicate a time period for the plurality of receivers of the wireless device to transition from a first low-power state (e.g., shallow sleep) to an active state. In the active state, the wireless device can be capable of receiving (or performing other operations) on at least the first WLAN channel. In one example, the wireless device can provide the third/capability message during an association stage (e.g., association between the wireless node and the wireless device). The wireless device can provide, specify and/or indicate the time period using a capability field/indicator (e.g., of the third message). For instance, the capability field/indicator can indicate a wake up time (e.g., time period) of the plurality of receivers of the wireless device. The capability field/indicator may include or correspond to a component or at least one bit in a standard-based or vendor specific information element.

Referring now to operation (406), and in some embodiments, the wireless node can transmit, send, and/or broadcast a second message (e.g., an OOB message and/or other types of messages) via a non-WLAN channel (e.g., BLE channel, UWB channel, and/or other types of low power communication channels/links). The second message may identify, specify and/or provide the first WLAN channel to a wireless device. In certain embodiments, the second message may cause a plurality of receivers (e.g., radios or Rx chains) of the wireless device to receive (e.g., receive data frames) on (or via) the first WLAN channel. In certain embodiments, the wireless device may include or correspond to a WLAN-based MLD (e.g., a WLAN based multilink HWD 150, a WLAN based multilink computing device 110, and/or other devices). In one example, after the wireless node identifies/selects the first WLAN channel (e.g., by performing the medium contention), the wireless node can send and/or provide a second message identifying the first WLAN channel to the wireless device. The first WLAN channel can be identified (e.g., in the second message) by using (or based on) a channel identifier (e.g., a number and/or index in a shared list of channels) of the first WLAN channel. The wireless node can transmit the second message by using a non-WLAN channel, such as an OOB channel. In certain embodiments, the wireless node can use BLE signaling, UWB signaling, and/or other custom signaling to transmit the second message (e.g., via the non-WLAN channel). In certain embodiments, the non-WLAN channel can be configured according to impulse radio approaches, index modulation approaches and/or other types of approaches, to implement or facilitate low-power transmission and/or reception of the second message. For example, the non-WLAN channel can be configured according to approaches that encode information (e.g., 1-2 bits of information) via on-off keying (OOK), subcarrier muting, frequency modulation, and/or other techniques. As such, transmitting the second message via the non-WLAN channel can decrease the power consumption of the wireless device (e.g., lower power consumption for listening and/or decoding information).

Responsive to receiving the second message (e.g., via the non-WLAN channel), the wireless device can tune, configure, enable and/or activate the plurality of receivers to receive (e.g., receive data frames from the wireless node) on the first WLAN channel (e.g., indicated in the second message). Referring now to operation (408), and in some embodiments, the wireless node may transmit at least one data frame (e.g., via the first WLAN channel) to the plurality of receivers. The wireless node may perform the transmission of the data frame(s) at least a defined duration (e.g., a SIFS duration) after the second message. In one example, the wireless node can send/transmit one or more frames on the first WLAN channel a SIFS time/duration (e.g., the defined duration) after (or following) the first message/frame (e.g., CTS message, QoS Null frame, and/or QoS data frame). As such, a sum of a transmission duration of the second message (e.g., a duration of an OOB message/signaling) and the time period (e.g., time period for the plurality of receivers to transition from the first low-power state to an active state, such as a wake up latency) is less than a sum of a transmission duration of the first message (e.g., a frame duration of a CTS/QoS-frame) and the defined duration (e.g., a SIFS duration). In certain embodiments, after/upon completion of the transmitting of the at least one data frame, the wireless node may transfer, allocate, (re)assign, and/or redirect a transmission opportunity to the wireless device. In one example, once/after the transmission of the data frame(s) is complete, the wireless node may transfer a TxOP (e.g. transmission opportunity) using a reverse direction protocol (RDP), a trigger-based uplink (UL) access, and/or other approaches.

After receiving an acknowledge (ACK) message (or other messages) from the wireless node, the wireless device can transmit at least one data frame via the first WLAN channel. In one example, the wireless device can use single channel medium contention (e.g., a Wi-Fi radio performing CCA-based contention) to transmit the data frame(s). In certain embodiments, the wireless device can use the granted transmission opportunity (e.g., TxOP) without performing medium contention to transmit the data frame(s). In some embodiments, the wireless device can transmit the data frame(s) via the first WLAN channel using UL transmissions via single channel designs. Responsive to the transmission of the data frame(s), the wireless device can return and/or transition into a low-power state (e.g., a first low-power state and/or a second low-power state, until a next scheduled wake-up time for example). Furthermore, the wireless device may continue to monitor the non-WLAN channel for an OOB signal (e.g., indicating a WLAN channel for performing Tx/Rx operations), or may transition the receiver for the OOB signal to a sleep/low-power state until the next scheduled wake-up time for instance.

Figure 5:
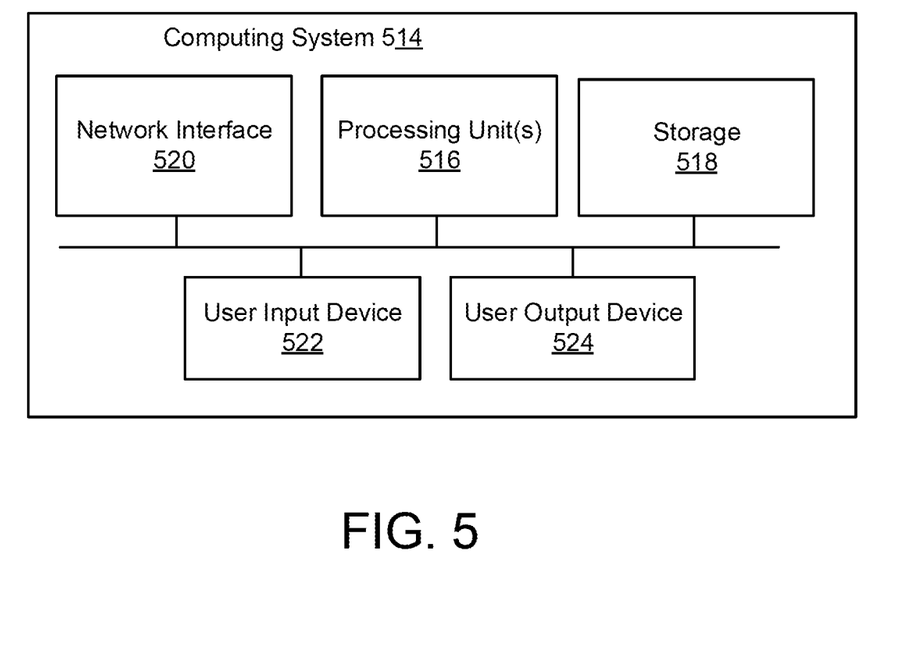
FIG. 5 is a block diagram of a computing environment, according to an example implementation of the present disclosure.

Various operations described herein can be implemented on computer systems. FIG. 5 shows a block diagram of a representative computing system 514 usable to implement the present disclosure. In some embodiments, the computing device 210, the HWD 250 or both of FIGS. 2-3 are implemented by the computing system 514. Computing system 514 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 514 can be implemented to provide VR, AR, MR experience. In some embodiments, the computing system 514 can include conventional computer components such as processors 516, storage device 518, network interface 520, user input device 522, and user output device 524.

Network interface 520 can provide a connection to a wide area network (e.g., the Internet) to which WAN interface of a remote server system is also connected. Network interface 520 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 522 can include any device (or devices) via which a user can provide signals to computing system 514; computing system 514 can interpret the signals as indicative of particular user requests or information. User input device 522 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 524 can include any device via which computing system 514 can provide information to a user. For example, user output device 524 can include a display to display images generated by or delivered to computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 516 can provide various functionality for computing system 514, including any of the functionality described herein as being performed by a server or client, or other functionality associated with message management services.

It will be appreciated that computing system 514 is illustrative and that variations and modifications are possible. Computer systems used in connection with the present disclosure can have other capabilities not specifically described here. Further, while computing system 514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about"

"substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   transmitting, by a wireless node, a first message to reserve at least a first wireless local area network (WLAN) channel;
   transmitting, by the wireless node via a non-WLAN channel, a second message identifying the first WLAN channel to a wireless device, to cause a plurality of receivers of the wireless device to receive on the first WLAN channel, the wireless device comprising a WLAN-based multilink device (MLD); and
   transmitting, by the wireless node after at least a defined duration after the second message, at least one data frame to the plurality of receivers of the wireless device, via the first WLAN channel.

2. The method of claim 1, comprising:
   performing, by the wireless node, medium contention on a plurality of WLAN channels, to identify the first WLAN channel from the plurality of WLAN channels.

3. The method of claim 2, comprising:
   performing, by the wireless node, the medium contention while the plurality of receivers of the wireless device are in a first low-power state.

4. The method of claim 3, comprising:
   performing, by the wireless node, the medium contention at or before a scheduled time at which the wireless device transitions the plurality of receivers from a second low-power state to the first low-power state.

5. The method of claim 1, wherein the first message comprises a clear-to-send (CTS) frame, a null frame, or an empty data frame.

6. The method of claim 1, wherein the first message is configured to indicate to the wireless device to skip or bypass sending an acknowledgement message.

7. The method of claim 1, comprising:
   receiving, by the wireless node from the wireless device, a third message indicating a time period for the plurality of receivers of the wireless device to transition from a first low-power state to an active state capable of receiving on at least the first WLAN channel.

8. The method of claim 7, wherein a sum of a transmission duration of the second message and the indicated time period is less than a sum of a transmission duration of the first message and the defined duration.

9. The method of claim 1, comprising:
   transferring, by the wireless node, a transmission opportunity to the wireless device, after completion of the transmitting of the at least one data frame.

10. A wireless node, comprising: at least one processor configured to:
    transmit, via a transceiver, a first message to reserve at least a first wireless local area network (WLAN) channel;
    transmit, via the transceiver on a non-WLAN channel, a second message identifying the first WLAN channel to a wireless device, to cause a plurality of receivers of the wireless device to receive on the first WLAN channel, the wireless device comprising a WLAN-based multilink device (MLD); and
    transmit, via the transceiver after at least a defined duration after the second message, at least one data frame to the plurality of receivers of the wireless device, via the first WLAN channel.

11. The wireless node of claim 10, wherein the at least one processor is configured to:
    perform, via the transceiver, medium contention on a plurality of WLAN channels, to identify the first WLAN channel from the plurality of WLAN channels.

12. The wireless node of claim 11, wherein the at least one processor is configured to:
    perform, via the transceiver, the medium contention while the plurality of receivers of the wireless device are in a first low-power state.

13. The wireless node of claim 12, wherein the at least one processor is configured to:
    perform, via the transceiver, the medium contention at or before a scheduled time at which the wireless device transitions the plurality of receivers from a second low-power state to the first low-power state.

14. The wireless node of claim 10, wherein the first message comprises a clear-to-send (CTS) frame, a null frame, or an empty data frame.

15. The wireless node of claim 10, wherein the first message is configured to indicate to the wireless device to skip or bypass sending an acknowledgement message.

16. The wireless node of claim 10, wherein the at least one processor is configured to:
   receive, via the transceiver from the wireless device, a third message indicating a time period for the plurality of receivers of the wireless device to transition from a first low-power state to an active state capable of receiving on at least the first WLAN channel.

17. The wireless node of claim 16, wherein a sum of a transmission duration of the second message and the indicated time period is less than a sum of a transmission duration of the first message and the defined duration.

18. The wireless node of claim 10, wherein the at least one processor is configured to:
   transfer a transmission opportunity to the wireless device, after completing transmission of the at least one data frame.

19. A non-transitory computer readable medium storing program instructions for causing at least one processor to:
   transmit, via a transceiver, a first message to reserve at least a first wireless local area network (WLAN) channel;
   transmit, via the transceiver on a non-WLAN channel, a second message identifying the first WLAN channel to a wireless device, to cause a plurality of receivers of the wireless device to receive on the first WLAN channel, the wireless device comprising a WLAN-based multi-link device (MLD); and
   transmit, via the transceiver after at least a defined duration after the second message, at least one data frame to the plurality of receivers of the wireless device, via the first WLAN channel.

20. The non-transitory computer readable medium of claim 19, wherein the program instructions further cause the at least one processor to:
   perform, via the transceiver, medium contention at or before a scheduled time at which the wireless device transitions the plurality of receivers from a second low-power state to a first low-power state.

* * * * *